M. C. HOLE.
PIPE SCREWING MACHINE.
APPLICATION FILED MAY 23, 1921.

1,401,405.

Patented Dec. 27, 1921.

INVENTOR.
Morris C. Hole
BY Frederick W. Ryou
ATTORNEY

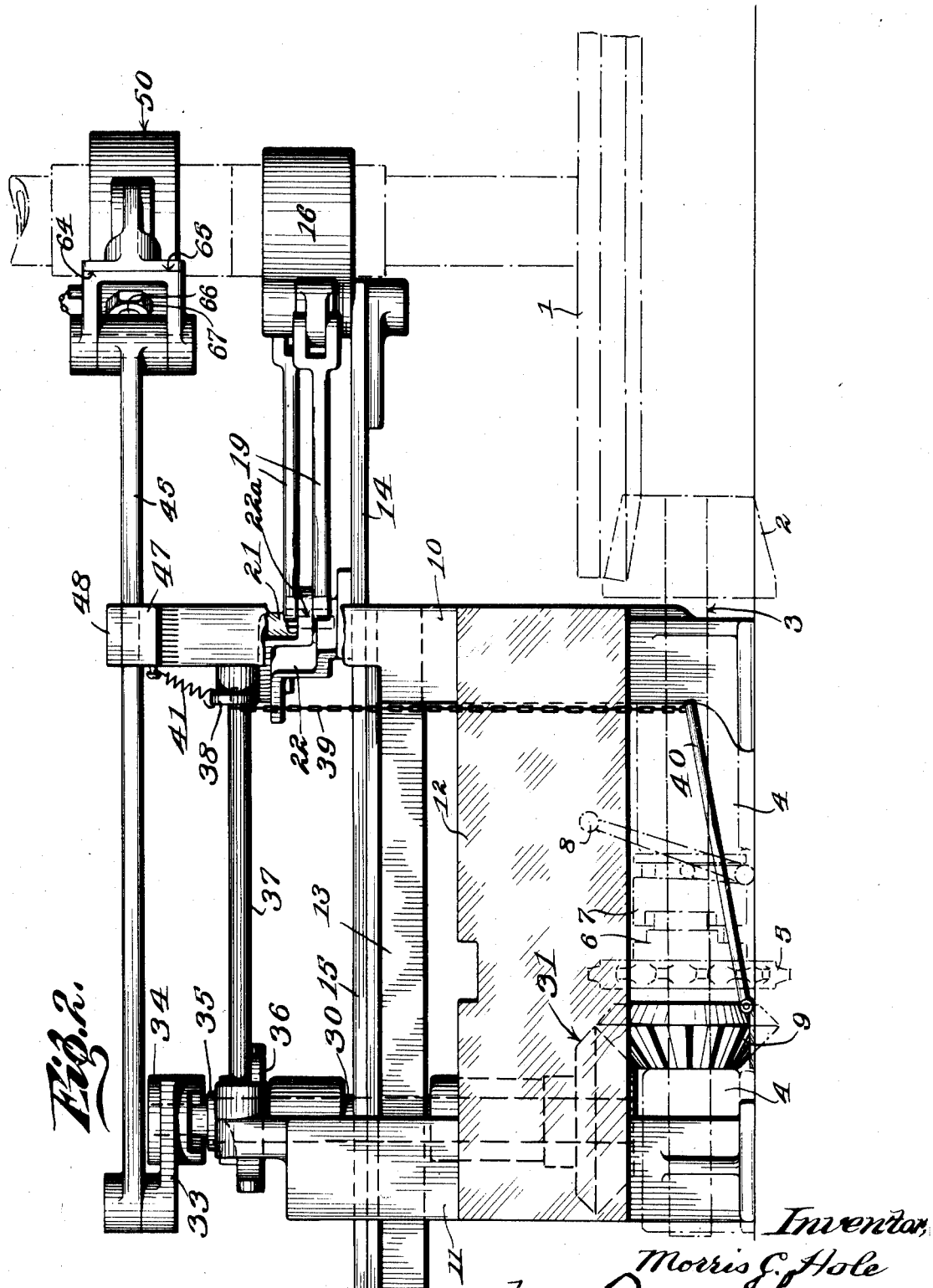

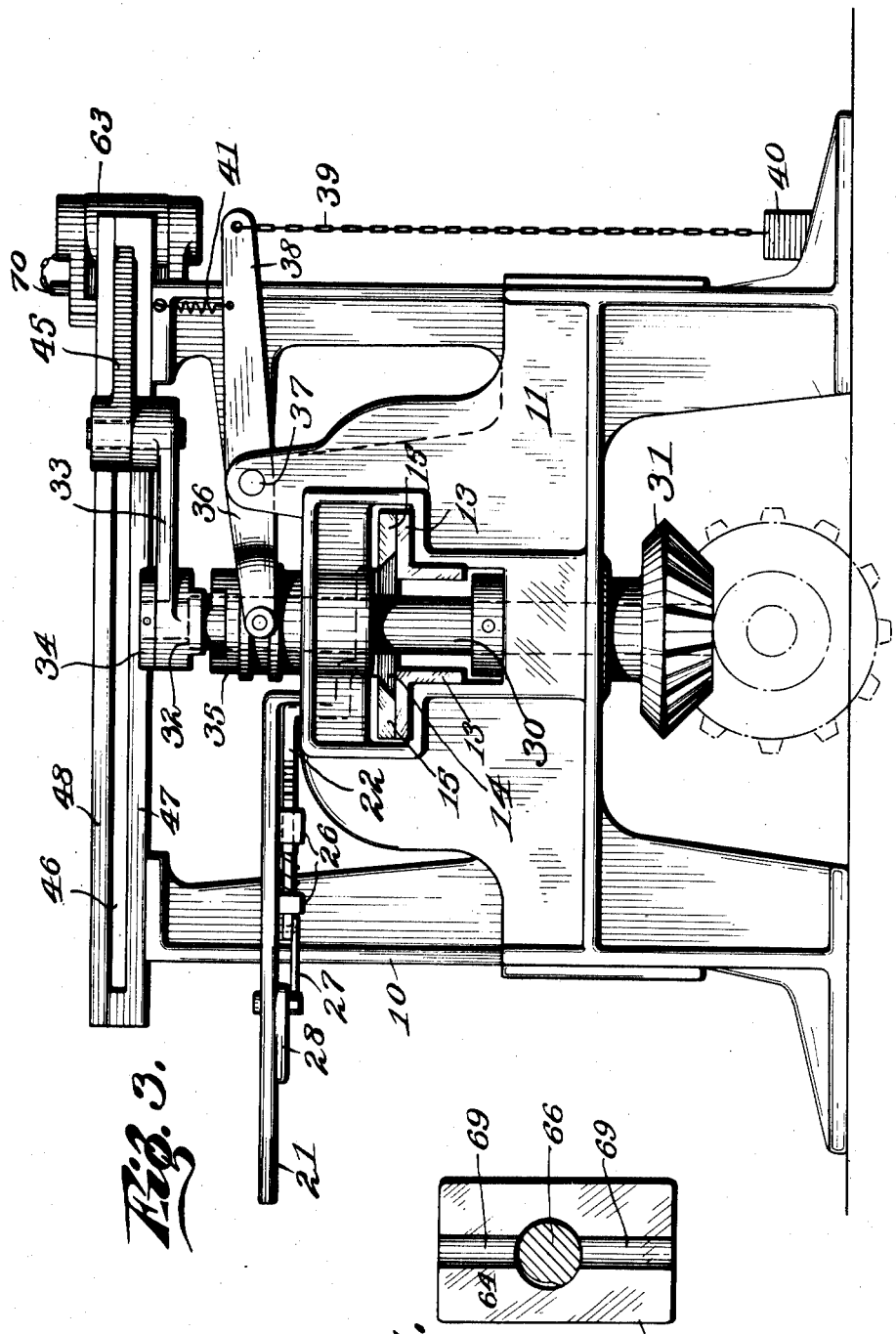

UNITED STATES PATENT OFFICE.

MORRIS C. HOLE, OF PASADENA, CALIFORNIA.

PIPE-SCREWING MACHINE.

1,401,405.  Specification of Letters Patent.  Patented Dec. 27, 1921.

Application filed May 23, 1921. Serial No. 471,939.

*To all whom it may concern:*

Be it known that I, MORRIS C. HOLE, a citizen of the United States, residing at Pasadena, in the county of Los Angeles and State of California, have invented a new and useful Pipe-Screwing Machine, of which the following is a specification.

This invention relates to a pipe screwing machine particularly adapted for the screwing together and the unscrewing of sections of drill tubing, well casing, and the like and for coöperation with the standard type of rotary well drilling machine such as is used for manipulating a string of vertically disposed drill tubing or casing in the well bore; the main object of the invention being to provide a power operated device by which such tubing may be screwed together for insertion in the well bore or the sections unscrewed for removal therefrom.

Another object is to provide a means for holding one pipe section against rotation while a power driven oscillatory pipe tong functions to rotate the adjacent pipe section and to provide a tong of a construction permitting its reversal to change the direction of its power stroke to reversely rotate said adjacent section.

A further object is to provide a device in which the oscillatory pipe tong and the table of the drilling machine are operated from a common source of power with intermediate clutch mechanisms enabling a simultaneous operation of both or the operation of either singly.

Various other objects and advantages will be more fully apparent from the following description of the accompanying drawings which form a part of this disclosure, and which illustrate a preferred form of embodiment of the invention.

Of the drawings:

Fig. 2 is a left side elevation.

Fig. 3 is a rear elevation.

Fig. 4 is an enlarged detail section on line $x^4$—$x^4$ of Fig. 1.

Figure 1:
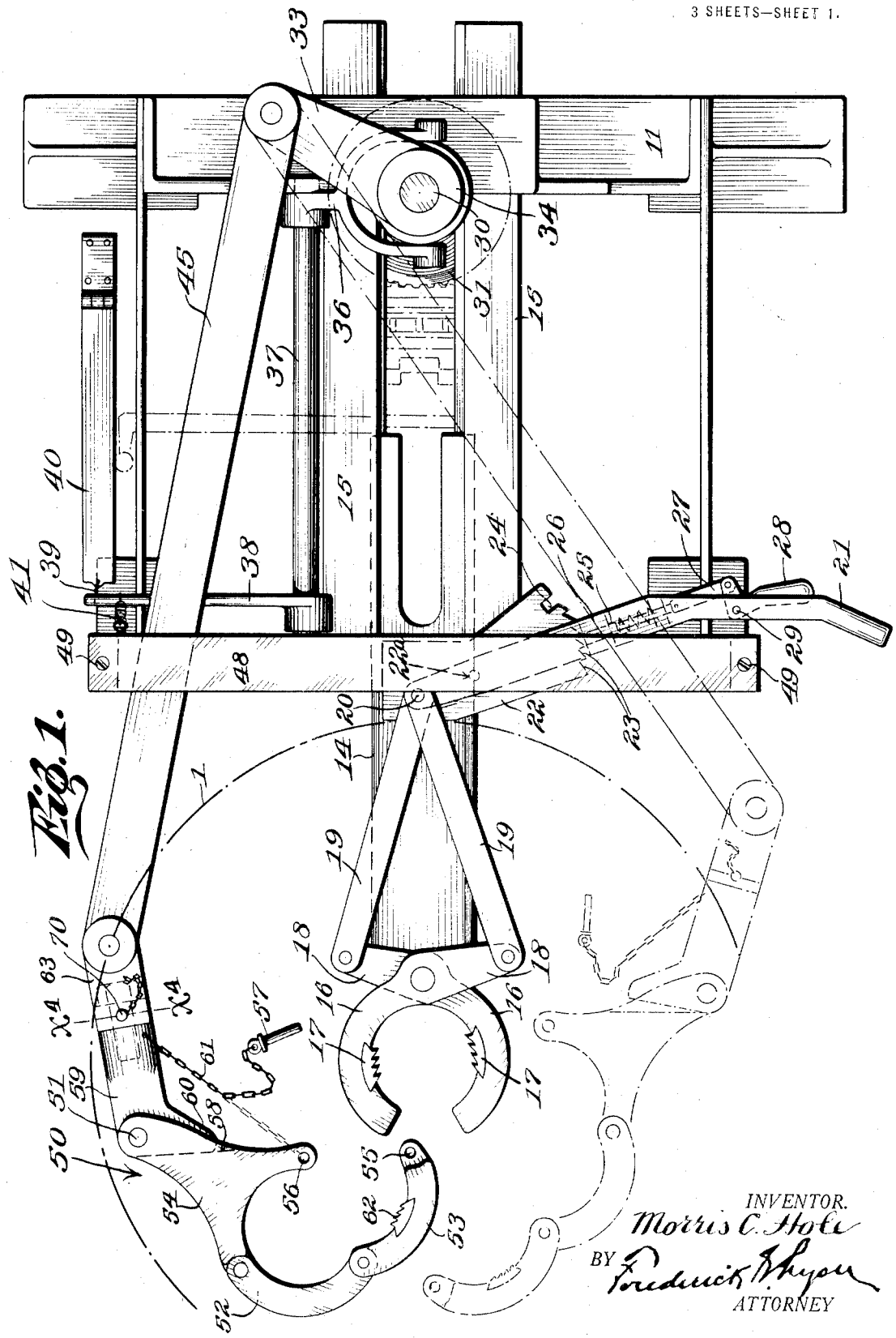
Figure 1 is a plan view of the device, the elements of the standard rotary drilling machine being indicated in dotted lines.

In Fig. 2, I have illustrated the device as associated with the standard type of rotary drilling machine, the main elements of which are illustrated in dotted lines. In general the drilling machine consists of a rotary gear table 1 which is supported upon suitable bearings (not shown) and which is driven by gear pinion 2 fixed on a horizontal shaft 3, such shaft being journaled in the bearing blocks 4. A drive sprocket 5 is loosely journaled on said shaft and is provided with a clutch element 6. A companion clutch member 7 is splined to the shaft and is laterally shiftable by the manipulation of a hand lever 8 to establish a driving connection between the sprocket 5 and the shaft 3 when desired. The parts thus far described are of standard construction and when the pipe machine is installed for coöperation therewith, a beveled pinion 9 is secured to the sprocket 5 so as to rotate therewith.

The various elements comprising the pipe machine are mounted upon the framework, comprising end frames 10—11 connected together by side plates 12. Centrally supported upon the frame in spaced relation is a pair of angle beams 13 and slidable upon said beams is a slide 14 retained thereon by gib plates 15 secured to the channel beams 13 and defining a longitudinal slideway for the slide. A pair of gripper jaws 16 are vertically pivoted on the forward end of the slide 14 and each jaw is provided with toothed inserts 17, the teeth of each insert being pointed rearwardly so that when the jaws engage a pipe section, said section will be held against rotation in either direction. Each jaw has a rearwardly extending arm 18 to which is pivotally connected a link 19 with both of said links pivotally connected at a common center 20 to the end of a manually operated lever 21. A plate 22 is fixed to the slide 14 and the lever 21 is pivotally journaled on said plate at 22ª, the outer portion of said plate being formed to provide a toothed quadrant having a series of ratchet teeth 23 and a single lock notch 24. (See Fig. 1.) Arranged to coöperate with the notch and the ratchet teeth is a spring plunger latch 25 slidably guided in depending lugs 26 on the lever 21 and connected by a link 27 with a latch handle 28 pivoted at 29 on the lever 21.

With the slide mechanism as described, in the position shown in Fig. 1, a manipulation of the mechanism to disengage the gripper jaws from the pipe section and retract the slide is as follows: The latch handle 28 is manipulated to withdraw the plunger 25 from engagement with the ratchet teeth 23 and the lever 21 is then moved rearwardly until the latch is alined with the lock notch 24, and then released to engage into said notch. This independent movement of the lever 21 will cause the gripper jaws 16 to be separated to free them from engagement with the pipe section and with the jaws so separated and the latch 25 engaging into the notch 24, the slide 14 will be retracted manually by the operator pulling rearwardly on the lever 21. In the reverse operation to engage the gripper jaws with the pipe section it will be understood that the slide is propelled forwardly, while the latch is in engagement with the notch 24, to bring the end of the slide into contacting engagement with the pipe section and that the latch handle 28 is then manipulated to withdraw the latch from the notch 24 and the lever 21 then rocked about its pivot 22 to swing the gripper jaws into contacting engagement with the pipe section, the latch 24 ratcheting over the teeth 23 until sufficient gripper tension of the jaws upon the pipe has been obtained.

The mechanism thus far described provides a manually operated means for holding a pipe section against rotation in either direction, this mechanism constituting associated elements having a primary operation translating the mechanism as a unit to or from the pipe section and the secondary operation functioning to subsequently grip the pipe section.

The mechanism for rotating the adjacent pipe section is adapted to be connected and disconnected alternately with the power drive and consists of a vertical shaft 30 journaled in suitable bearings in the end frame 11 and having a beveled pinion 31 fixed to its lower end and meshing with the beveled pinion 9. The upper end of the shaft 30 is reduced in diameter to provide a shoulder 32 and loosely journaled upon said reduced portion and resting upon the shoulder is a crank arm 33 which is retained against axial displacement by a collar 34 fixed to the upper end of the shaft. Splined upon the shaft 30 is a clutch element 35 having clutch teeth at its upper end which coöperate with companion clutch teeth on the lower surface of the crank arm 33 and said clutch element 35 is axially translated by a rock arm 36 which is fixed to a rock shaft 37 journaled in bearings in the end frames 10—11. Fixed to said rock shaft adjacent its opposite end is an arm 38 connected by a chain 39 with a foot treadle 40. A spring 41 attached to the frame 10 and to the arm 38 maintains the clutch element 35 and associated mechanism in normal position with its clutch teeth disengaged from the companion clutch teeth of the crank arm 33.

Pivotally connected to the outer end of the crank arm 33 is a link 45 which extends forwardly through a transverse guide slot 46, said slot being formed in a transverse plate 47 secured upon the upper surface of the frame 10 and having a removable top plate 48 secured in place by screws 49. Pivoted on the free end of the link 45 is a pipe tong indicated generally by the reference character 50. In the broadest aspect of the present invention the specific type of the pipe engaging portion of the pipe tong employed is not of major importance as it is readily understood that various other types of tong may be utilized in this device. The tong illustrated in the drawings comprises a two-part shank pivotally connected at 51 and two jaw members 52—53, the member 52 being pivotally connected to the shank member 54 and the member 53 being pivotally connected on the free end of the member 52. The member 53 has a pin aperture 55 at its free end adapted to aline with a companion aperture 56 in the shank member 54 when the jaws of the tong encircle a pipe section, and when the apertures are so alined a lock pin 57 is placed therein to prevent a disengagement of the tong from the pipe section.

It is of importance in the machine of the present invention that the tong be capable of being engaged with the pipe while the crank arm 33 is in any position and to this end I have provided a tong having a two-part hingedly united shank with the hinge connection constructed so that the two shank members may be locked against relative movement during the pipe manipulating oscillations of the tong. The shank member 54 of the tong has an abutment shoulder 58 and the shank member 59 has a laterally extending nose 60 which coöperates with the abutment shoulder to limit the swinging movement of the member 54 in one direction relative to the member 59. To limit the swinging movement of the shank members in an opposite direction when the tong is engaged with a pipe section, the lock pin 57 has a chain 61 attached thereto with the opposite end of the chain attached to the shank member 59, the length of the chain being such that when the lock pin 57 is engaged in its companion apertures there will be relatively no slack in the chain.

The jaw member 53 is a toothed insert 62 with the teeth disposed so that with the tong in the position shown in full lines in Fig. 1, the pipe section engaged thereby will be turned in a right hand or clockwise direction. To rotate a pipe section in the reverse or left hand direction, it is necessary to reverse the pipe tong to the position indicated in dotted lines in Fig. 1 and to accomplish this the shank member 59 is of two-part construction which permits the shank member 59 to be rotated upon the companion member 63. The members 59 and 63 have vertically disposed co-engaging surfaces 64 and 65 and are horizontally pivotally connected together by a screw stud 66 which permits a turning of the member 59 upon the member 63 to reverse the position of the tong from the full line position to the dotted line position shown in Fig. 1, the members 59 and 63 being clamped together in either of their adjusted positions by a clamp nut 67. For the purpose of accurately alining the member 59 upon the member 63 in either of its two positions, the abutting surfaces 64 and 65 are provided with semi-circular recesses 69 (see particularly Fig. 4), said recesses cooperating to form circular alining apertures which are adapted to accommodate an alining pin 70. It will be evident that the tong may be reversed by first loosening the nut 67 and removing the pin 70, and then swinging the tong upon the stud 66, after which the pin 70 will be reinserted to accurately aline the members 59 and 63 and the nut 67 to rigidly clamp the shank members together.

In the operation of the machine the slide 14 is manipulated by the hand lever 21 as previously explained to engage and grip one pipe section and retain it against rotation and the tong is swung to embrace the adjacent pipe section. With the parts thus disposed, the foot treadle is depressed to clutch the shaft 30 to the crank arm. A rotation of the shaft 30 will then cause an oscillation of the tong through its link connection with the crank arm and will unscrew the pipe sections or screw them together depending upon the position to which the pipe tong has been initially adjusted.

In well drilling practice it is customary in some instances to utilize the standard rotary drilling machine to back off the lower section of tubing from the upper section after the joint has been "cracked." This method of manipulation can be accomplished with the device of the present invention if desired by first "cracking" the joint by the combined use of the gripper jaws and the power driven pipe tong and then disengaging the gripper jaws from the pipe and allowing the table 1 to rotate the lower section in one direction while the gong rotates the adjacent section in the reverse direction.

From the above it will be evident that this invention provides a machine having means for holding a pipe section against rotation in either direction and having a power driven oscillatory pipe tong which engages an adjacent pipe section and which is operable to intermittently turn the same, the tong being reversible to change the direction of its power stroke.

It will also be evident that although the present invention provides a machine which is capable of operation in conjunction with standard type of rotary drilling machines, it is capable of use separate from such drilling machine, or that it may be driven from a separate source of power even when used in connection with a drilling machine.

While the form of mechanism shown and described herein is admirably adapted to fulfill the objects primarily stated, it will be evident that it is susceptible of various changes and modifications, all of which lie within the scope of the claims which follow.

I claim:

1. In a device of the nature disclosed the combination including a frame, a rotary drive element, means for holding a pipe section against rotation, an oscillatory pipe tong adapted to engage and operable to intermittently turn the adjacent pipe section, and motion transmitting mechanism intermediate the drive element and the tong.

2. In a device of the nature disclosed the combination including a frame, a rotary drive element, manually operated means adapted to grip and hold a pipe section against rotation, an oscillatory pipe tong adapted to engage and intermittently rotate the adjacent pipe section, and motion transmitting mechanism intermediate the tong and the drive element.

3. In a device of the nature disclosed the combination including a frame, means associated with the frame and operable to grip and hold a pipe section against rotation, a rotary crank arm, a connecting rod pivoted to said crank arm, and an oscillatory pipe tong pivoted on the opposite end of the connecting rod and adapted to engage and intermittently rotate the adjacent pipe section.

4. In a device of the nature disclosed the combination including a frame, means associated with the frame and manually operable to grip and hold a pipe section against rotation in either direction, a rotary crank arm, a connecting rod pivotally connected to the free end of said arm, and an oscillatory pipe tong pivoted on the free end of the connecting rod and adapted to engage and intermittently rotate the adjacent pipe section.

5. In a device of the nature disclosed the combination including a frame, a rotary drive element, means for holding a pipe section against rotation, an oscillatory pipe tong adapted to engage and turn the adjacent pipe section and reversible to oppositely engage and turn said section, and motion transmitting mechanism intermediate the drive element and the tong.

6. In a device of the nature disclosed the combination including a frame, a rotary drive element, manually operated means adapted to grip and hold a pipe section against rotation, an oscillatory pipe tong adapted to engage and intermittently rotate the adjacent pipe section in one direction and reversible to oppositely engage and intermittently rotate said section in the reverse direction, and motion transmitting mechanism connecting the drive element and the tongs.

7. In a device of the nature disclosed the combination including a frame, means associated with the frame and operable to grip and hold a pipe section against rotation, a rotary crank arm journaled on the frame, a connecting rod pivoted on the free end of the crank arm, an oscillatory pipe tong pivoted on the free end of the connecting rod and adapted to engage and intermittently rotate said section in the reverse direction.

8. In a device of the nature disclosed the combination including a frame, means carried by the frame and manually operable to grip and hold a pipe section against rotation, a crank arm journaled in the frame, a connecting rod pivoted on the free end of said arm, an oscillatory pipe tong pivoted on the free end of the connecting rod and adapted to engage and intermittently rotate the adjacent pipe section in one direction and reversible to oppositely engage and intermittently rotate said section in a reverse direction.

9. In a device of the nature disclosed the combination including a frame, a slide carried by the frame, opposed gripper jaws carried on the slide, manually operated means for translating the slide and for subsequently contracting the jaws to grip and hold a pipe section against rotation, a rotary drive element journaled on the frame, an oscillatory pipe tong adapted to engage and rotate the adjacent pipe section, and motion transmitting mechanism connecting the tong and drive element.

10. In a device of the nature disclosed the combination including a frame, a drive shaft journaled in the frame, a rotary crank element journaled loose on said shaft, clutch means intermediate said element and shaft, a connecting rod pivoted on the crank pin of said element, an oscillatory pipe tong pivoted on the free end of the connecting rod and adapted to engage and intermittently turn a pipe section, and means associated with the frame and operable to hold the adjacent pipe section against rotation.

11. In a device of the nature disclosed the combination including a frame, a rotary drive element, an oscillatory pipe tong adapted to engage and intermittently rotate a pipe section, motion transmitting mechanism intermediate said element and tong for converting the rotary movement of the drive element into an oscillatory movement of the tong, a slide carried by the frame, opposed gripper jaws carried by the slide, a manually operable member carried by the slide and connecting with the jaws, and means locking said member to the slide to move as a unit and releasable to permit an independent movement of said member for contracting the jaws to grip and hold the adjacent pipe section against rotation.

12. In a device of the nature disclosed the combination including the table and the drive member of a rotary well drilling machine, constantly driven power mechanism, a frame, means associated with the frame and functioning to grip and hold a pipe section against rotation, a rotary member journaled on the frame, an oscillatory pipe tong adapted to engage and intermittently rotate the adjacent pipe section, motion transmitting mechanism connecting the tongs with said rotary member, clutch means between the power mechanism and the rotary member, and clutch means between the power mechanism and the table drive member.

Signed at Los Angeles, California, this 13th day of May, 1921.

MORRIS C. HOLE.

Witnesses:
CLARENCE B. FOSTER,
L. BELLE WEAVER.